US012509942B2

(12) United States Patent
Velasquez

(10) Patent No.: US 12,509,942 B2
(45) Date of Patent: Dec. 30, 2025

(54) PORTABLE ROPE LADDER AND METHOD

(71) Applicant: Vincent Michael Velasquez, Cumming, GA (US)

(72) Inventor: Vincent Michael Velasquez, Cumming, GA (US)

( * ) Notice: Subject to any disclaimer, the term of this patent is extended or adjusted under 35 U.S.C. 154(b) by 904 days.

(21) Appl. No.: 17/742,364

(22) Filed: May 11, 2022

(65) Prior Publication Data

US 2022/0364416 A1 Nov. 17, 2022

Related U.S. Application Data

(60) Provisional application No. 63/187,164, filed on May 11, 2021.

(51) Int. Cl.
*E06C 1/56* (2006.01)

(52) U.S. Cl.
CPC ...................................... *E06C 1/56* (2013.01)

(58) Field of Classification Search
CPC ... E06C 1/56; E06C 1/52; A63B 27/00; A63B 27/02; A62B 35/00; A62B 35/006
See application file for complete search history.

(56) References Cited

U.S. PATENT DOCUMENTS

| | | | | | |
|---|---|---|---|---|---|
| 4,120,377 | A * | 10/1978 | Charles | A63B 27/00 | 182/135 |
| 5,540,178 | A * | 7/1996 | Damron | B63B 27/14 | 441/39 |
| 5,848,667 | A * | 12/1998 | Davidson | E06C 5/26 | 182/196 |
| 6,035,966 | A * | 3/2000 | Lewis | A63B 27/00 | 182/7 |
| 6,357,551 | B1 * | 3/2002 | Bogardus, III | E06C 1/56 | 182/196 |
| 6,464,038 | B1 * | 10/2002 | Park | A63B 29/02 | 182/91 |
| 7,051,497 | B2 * | 5/2006 | Peterson | E06C 1/56 | 54/44.1 |
| 7,585,197 | B1 * | 9/2009 | Merten | E06C 1/56 | 182/189 |

FOREIGN PATENT DOCUMENTS

PL 65543 Y1 * 7/2011

* cited by examiner

*Primary Examiner* — David E Martinez
(74) *Attorney, Agent, or Firm* — Steven C. Stewart

(57) ABSTRACT

A portable rope ladder and method to enable a climber to continuously climb a tree, pole or other object with the portable rope ladder using an end of end technique is disclosed.

7 Claims, 4 Drawing Sheets

PORTABLE ROPE LADDER AND METHOD

TECHNICAL FIELD

These claimed embodiments relate to a portable rope ladder and a method for climbing a tree or pole with the portable rope ladder.

BACKGROUND OF THE INVENTION

A ladder apparatus to climb a pole or tree and method for using the same is disclosed.

A climber often needs to climb trees, poles, or other objects to perform maintenance on the object, to retrieve something on the object or for hunting from an elevated position on the object. The climber may use ladders, climbing stick or climbing stands to climb up the object, but ladders, climbing sticks and climbing stands are bulky, difficult to bring to remote locations and can make a animal frightening metallic noise. The climber has used other types of ropes to climb object, but they often require arm strength to climb or are time consuming to set up on the object itself.

SUMMARY OF THE INVENTION

In one implementation a ladder is disclosed that includes a plurality of rungs connected between a pair of parallel extending rails, the rails have a first end and a second end. A first loop and second loop are operable to wrap around an object, such as a tree or poll. The first and second loop are formed with a rope having a hook portion disposed at one end of the rope that removably engages with a loop portion disposed at another end of the rope. The first loop is connected to the rails at the first end, and the second loop is connected to the rails at the second end. A first pair of stirrups is connected to the first loop adjacent the first end of the rails, and a second pair of stirrups connected to the second loop adjacent the second end of the rails. A first cinch strap is coupled with the first loop and a second cinch strap is coupled with the second loop.

In another implementation, a method for climbing an object with a ladder is described. The ladder includes a plurality of rungs connected between a pair of parallel extending rails. The rails have a first end and a second end, a top loop and bottom loop formed with a rope and each have a hook portion disposed at one end of the rope that engages with a loop portion disposed at another end of the rope. The top loop is connected to the rails at the first end, and the bottom loop is connected to the rails at the second end. A first pair of stirrups is connected to the first loop adjacent the first end of the rails. A second pair of stirrups is connected to the second loop adjacent the second end of the rails. A top cinch strap is coupled with the top loop and a bottom cinch strap is coupled with the bottom loop. The method includes attaching the top loop to an object to be climbed using the hook portion and the loop portion of the top loop. The bottom loop or the bottom cinch strap is attached to a climber's belt and/or climbing saddle. A lineman's belt wraps around the tree or object to be climbed, and connects to the climber's belt/saddle on each side holding the climber next to the object to be climbed as the climber uses the ladder to climb the object to be climbed. The rungs are climbed while sliding up the lineman's belt along the object to be climbed. The climber step into the first stirrups. The bottom loop and/or the bottom cinch strap is disconnected from the climber's belt. The bottom loop is pulled up using the bottom cinch strap or by simply reaching down (by the climber) and pulling it up. The bottom loop is raised above the climber's head. The pulled up bottom loop is wrapped around the object to be climbed and cinched using the hook portion and loop portion of the pulled up bottom loop whereby the bottom loop and the bottom cinch strap becomes a current top loop and current top cinch strap and the top loop and the top cinch strap becomes a current bottom loop and a current bottom cinch strap. The climber steps from the first stirrups to a current bottom rung of the plurality of rungs. The current bottom cinch strap coupled to the current bottom loop is released. The hook and loop is separated on the current bottom loop, and the current bottom cinch strap on the current bottom loop is attached to the climbers belt.

In a further implementation, a method for constructing a portable ladder is includes connecting a plurality of rungs between a pair of parallel extending rails each having a first end and a second end. A first loop is formed with a rope having a hook portion disposed at one end a rope. The hook portion engages with a first loop portion disposed at another end of the rope. A second loop with second rope is formed having a second hook portion disposed at one end of a second rope. The hook portion engages with a second loop portion disposed at another end of the second rope. The first loop connects to the rails at the first end, and the second loop connects to the rails at the second end. A first pair of stirrups connects to the first loop adjacent the first end of the rails, and a second pair of stirrups connects to the second loop adjacent the second end of the rails. The first cinch strap couples with the first loop and a second cinch strap couples with the second loop.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
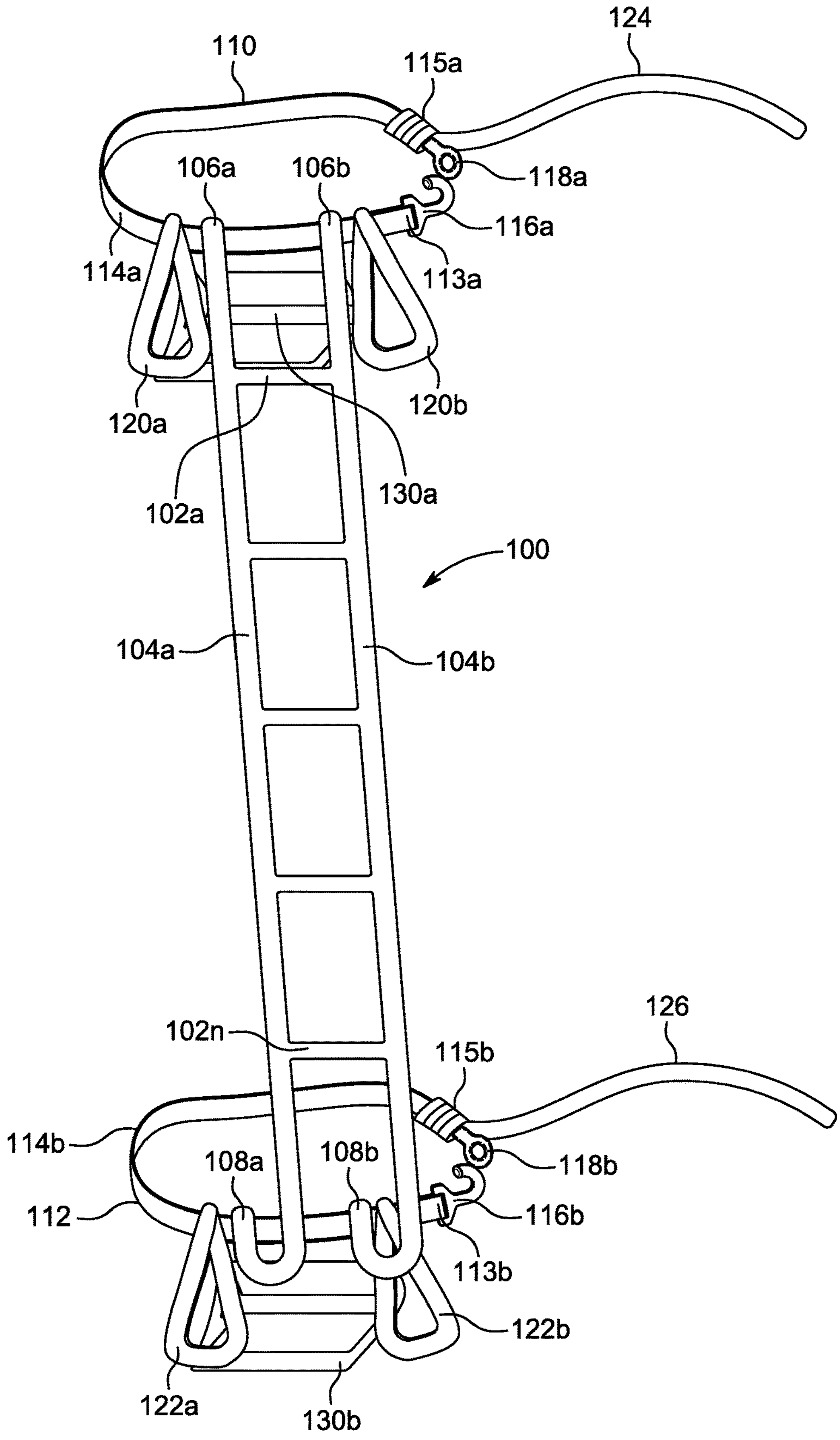
FIG. 1 is a perspective view of portable ladder.

Referring to FIG. 1 there is shown a portable ladder 100. The portable ladder 100 includes a plurality of rungs 102_a-n_ (also referred to herein as steps) connected between a pair of parallel extending rails 104_a_ and 104_b_. In one implementation rugs 102_a-n_ may extend parallel to each other and are evenly spaced on rails 104_a_-104_b_ from between about 0.5 feet to 2 feet apart. Rail 104_a_ has a first end 106_a_ and a second end 108_a_, and rail 104_b_ has a first end 106_b_ and a second end 108_b_.

In one implementation, portable ladder 100 is made from a rope material constructed of certain natural or synthetic fibers. Common natural fibers for rope are manila hemp, hemp, linen, cotton, coir, jute, straw, and sisal. Synthetic fibers in use for ropemaking include polypropylene, nylon, polyesters (e.g. PET, LCP, Vectran), polyethylene (e.g. Dyneema and Spectra), Aramids (e.g. Twaron, Technora and Kevlar) and acrylics (e.g. Dralon). The rope material for the ladder 100 may also be a mixture of natural and synthetic fibers.

A first loop 110 and a second loop 112 of ladder 100 are each formed with a rope 114*a* and rope 114*b* that each have a hook portion 116*a* and 116*b* and loop portion 118*a* and 118*b* respectively disposed at a first end 113*a* and 113*b* and second end 115*a* and 115*b* of rope 114*a* and 114*b*. During use of the ladder 100, loops 110 and 112 wrap around a pole or tree (or any object to be climbed). Hook portions 116*a* and 116*b* respectively engage with loop portion 118*a* and 118*b*.

The first loop 110 is connected to the rails 104*a* and 104*b* at the first end 106*a* and 106*b*. The second loop 112 is connected to the rails 104*a* and 104*b* at the second end 108*a* and 108*b*.

A first pair of stirrups 120*a* and 120*b* are connected to the first loop 110 adjacent to and outside of the first end 106*a* and 106*b* of the rails 104*a* and 104*b*. A second pair of stirrups 122*a* and 122*b* are connected to the second loop 112 adjacent to and outside of the second end 108*a* and 108*b* respectively of the rails 104*a* and 104*b*.

A first cinch strap 124 may be integral to and be a continuous part of loop 110. Strap 124 feeds through a cinch strap buckle or a prussik knot (not shown) on loop 110. A second cinch strap 126 may be similarly integral to and a continuous part of loop 112. Strap 126 also feeds through a cinch strap buckle or prusik knot (not shown) on loop portions 118*a* and/or 118*b*. Both cinch strap buckles may have webbing material attached that allows loop portions 118*a* and 118*b* to attach to hooks 116*a* and 116*b*. Loop portions 118*a* and 118*b* are incorporated in and are part of the cinch buckles and/or prusik knots. Loop portions 118*a* and 118*b* slide in and out along cinch straps 124 and 126 to adjust for a diameter of a tree (or pole) to be climbed. Spacers blocks 130*a* and 130*b* may be coupled to first loop 110 and second loop 112 respectively while engaging with a back portion of rails 104*a* and 104*b* to ensure rails 104*a-b* and steps 102*a-n* are spaced apart from the tree during ladder 100 operation and create space behind the rails allowing room to engage the climber's feet on the rungs 102*a*-102*n*.

Example Ladder Operation

Figure 2:
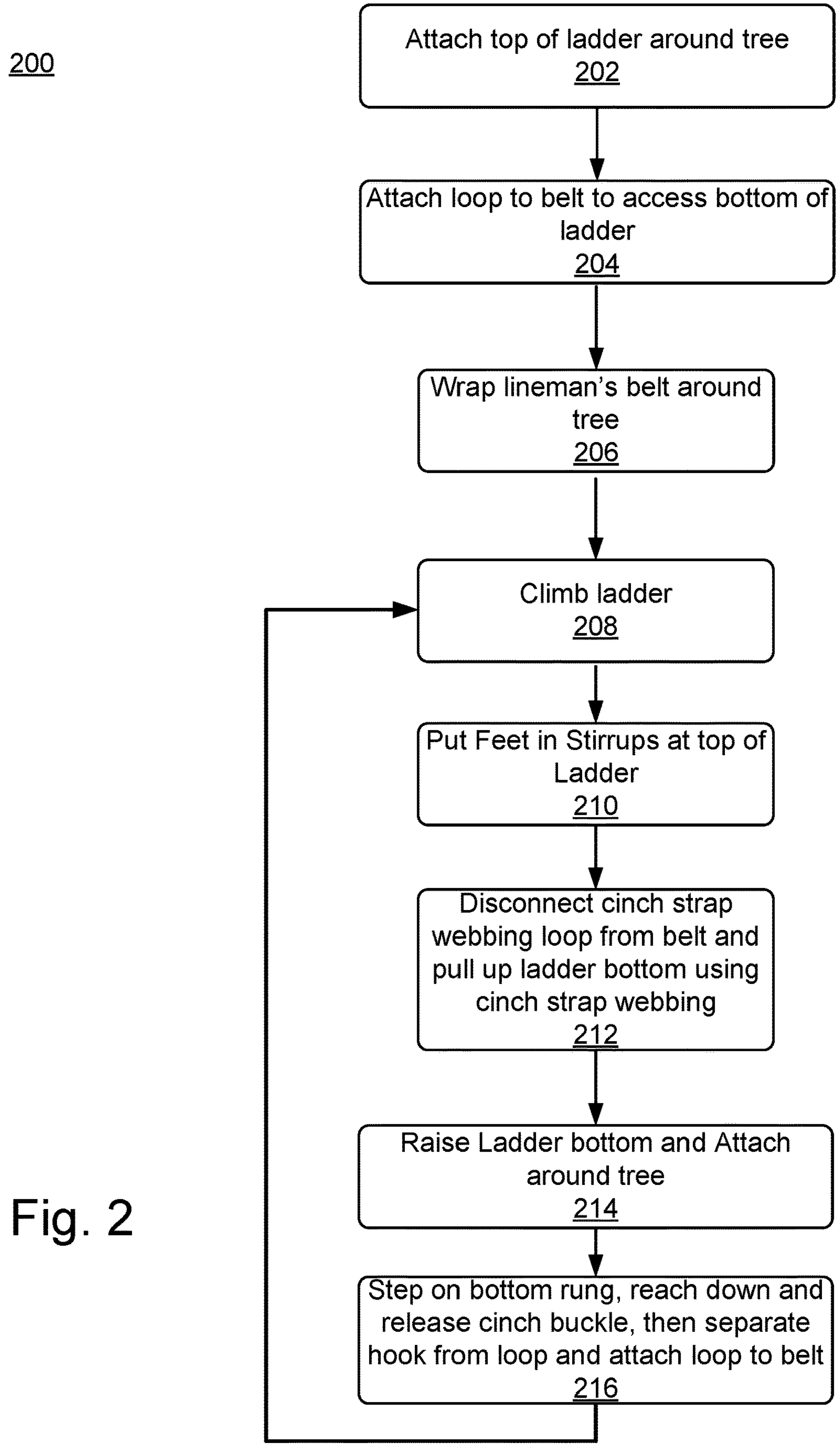
FIG. 2 is a flow chart of a method of using the portable ladder to climb a tree.

Illustrated in FIG. 2, there is shown a process 200 for using a ladder 100 to climb a tree. The exemplary process in FIG. 2 is illustrated as a collection of blocks in a logical flow diagram, which represents a sequence of operations that can be implemented in using ladder 100. The order in which the operations are described is not intended to be construed as a limitation, and any number of the described blocks can be combined in any order and/or in parallel to implement the process. For discussion purposes, the processes are described with reference to FIGS. 1, and 3-4, although it may be implemented in other rope ladders.

Figure 3:
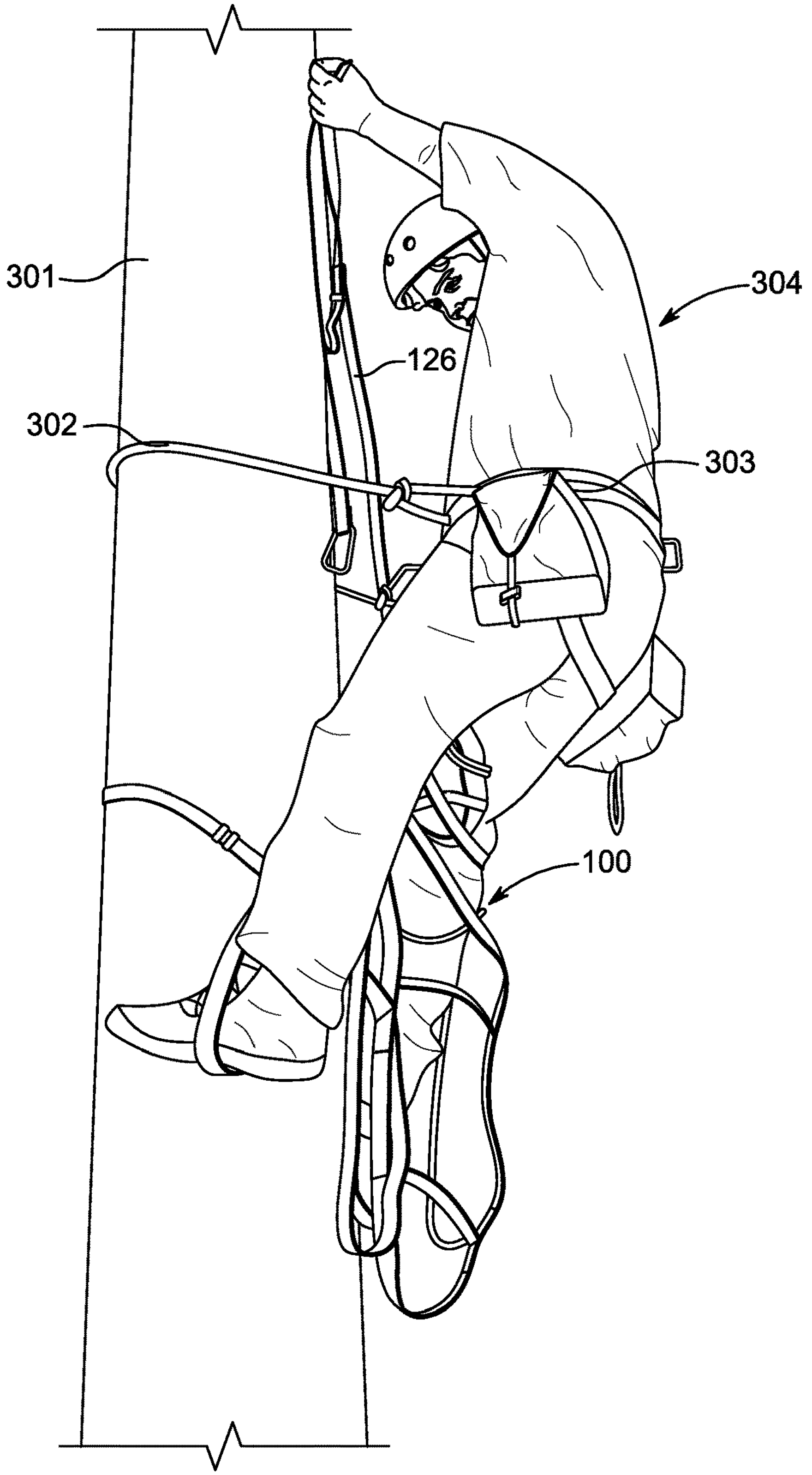
FIG. 3 is an isometric view of a subject using the portable ladder to climb a tree as in step 212 of FIG. 2.
Figure 4:
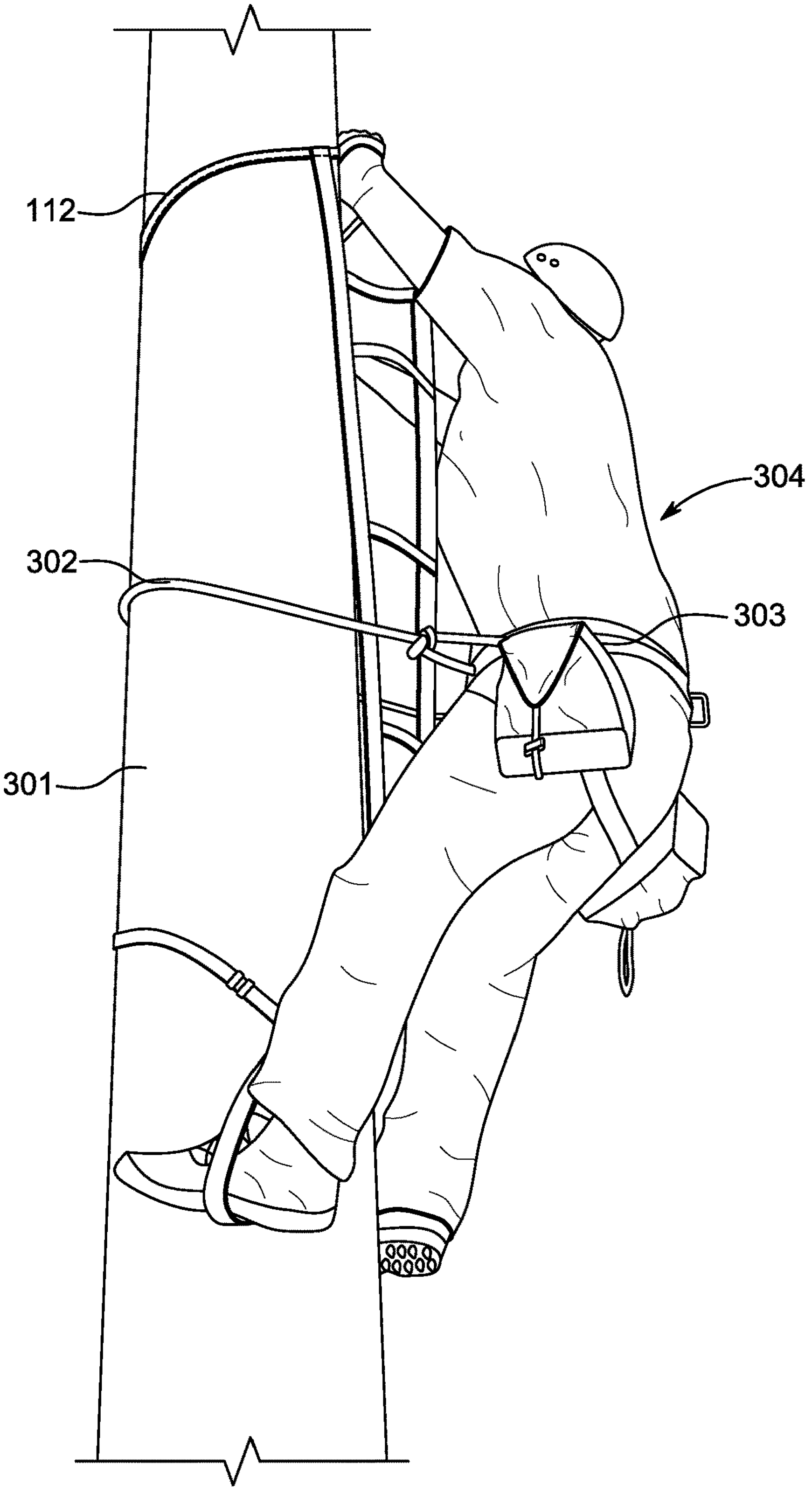
FIG. 4 is an isometric view of a subject using the portable ladder to climb a tree as in step 214 of FIG. 2.

Referring to FIG. 2, a method 200 is shown for climbing a tree 301, pole or any object to be climbed using the ladder 100 shown in FIG. 1 and with the lineman's belt 302 (also referred to as a loop belt) that is shown in FIGS. 3-4.

In the process, a climber 304 (FIGS. 3-4) attaches the first (or top) loop 110 (FIG. 1) to a tree in block 202 using hook portion 116*a* and loop portion 118*a* of that loop 110.

In block 204, the climber 304 (also referred to as a user) attaches to the second (or bottom) loop 112 and/or second (or bottom) cinch strap 126 on the climber's belt 303 to enable future access to the bottom (now second loop 112) of ladder 100.

In block 206 the climber 304 wraps the linemen's belt 302 around the tree/pole 301 (FIGS. 3-4). The climber 304 also attaches the linemen's belt 302 to him or herself as seen in FIG. 3.

In block 208, the climber 304 climbs the rungs/steps 102 of the ladder 100 while sliding up the lineman's belt 302 along the tree/pole.

In block 210, the climber 304 puts feet (e.g., steps) in the first stirrups 120*a* and 120*b* now located at the top of ladder 100.

In block 212, the climber 304 disconnects the second (bottom) cinch strap (webbing loop) 126 from the Lineman's belt 303 and pulls up the bottom of the ladder 100 (including second loop 112) using the bottom cinch strap 126. (See FIG. 3)

In block 214, the climber 304 raises the bottom of the ladder 100 (e.g., the second or bottom loop 112) above the climber's head. Climber 304 then wraps the second loop 112 (which now becomes the first or current top loop 110) around the tree/pole and locks the second loop (current top loop) 112 into place on the tree/pole using the hook portion 116*b* and loop portion 118*b* or loop 112. (See FIGS. 1 and 4).

In block 216, the climber 304 steps on the bottom rung 102*n*, reaches down and releases the cinch strap 126 coupled to the current (top) first loop 112. The climber 304 then separates the hook 116*b* and loop 118*b* on the second loop 112 (now the bottom loop). The climber 304 attaches the cinch strap 126 on the second or bottom loop 112 to a belt 303 of climber 304.

The climber 304 then repeats steps 208-216 until the climber 304 has reached the desired height on the tree/pole (or object to be climbed).

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for climbing an object with a ladder that includes a plurality of rungs connected between a pair of parallel extending rails, the rails having a first end and a second end, a top loop and bottom loop formed with a rope and each having a hook portion disposed at one end of the rope that engages with a loop portion disposed at another end of the rope, the top loop connected to the rails at the first end, and the bottom loop connected to the rails at the second end, a first pair of stirrups connected to the first loop adjacent the first end of the rails, a second pair of stirrups connected to the second loop adjacent the second end of the rails, and a top cinch strap coupled with the top loop and a bottom cinch strap coupled with the bottom loop, the method comprising:

a) attaching the top loop to an object to be climbed using the hook portion and the loop portion of the top loop;

b) attaching at least one of the bottom loop and the bottom cinch strap to a climber's belt;

c) wrapping a lineman's belt around the object to be climbed and connecting the lineman's belt to the climber's belt;

d) climbing the plurality of rungs while sliding up the lineman's belt along the object to be climbed;

e) stepping into the first stirrups;

f) disconnecting at least one of the bottom loop and the bottom cinch strap from the climber's belt;

g) pulling up the bottom loop using the bottom cinch strap;

h) raising the bottom loop above the climber's head;

i) wrapping the pulled up bottom loop around the object to be climbed and locking the pulled up bottom loop on the object to be climbed using the hook portion and loop portion of the pulled up bottom loop whereby the bottom loop and bottom cinch strap becomes a current top loop and current top cinch strap and the top loop and top cinch strap becomes a current bottom loop and current bottom cinch strap;

j) stepping from the first stirrups to a current bottom rung of the plurality of rungs;

k) releasing the current bottom cinch strap coupled to the current bottom loop; and l) separating the hook and loop on the current bottom loop.

2. The method as recited in claim 1 further comprising continuously repeating steps a)-l) to climb the object to be climbed.

3. The method as recited in 5 wherein wrapping the lineman's belt around the object to be climbed includes wrapping the lineman's belt around the object to be climbed and a climber.

4. The method as recited in 5 further comprising coupling spacer blocks to top loop and bottom loop while engaging with a back portion of the rails to ensure the rails and rungs are spaced apart from the object to be climbed during steps a)-l).

5. The method as recited in claim 1 further comprising sliding one or more of the loop portions along each of the cinch straps respectively to adjust for a diameter of the object to be climbed.

6. The method as recited in claim 1 wherein pulling up the bottom loop includes pulling up the bottom loop using the bottom cinch strap.

7. The method as recited in claim 1 further comprising attaching the current bottom cinch strap on the current bottom loop to the climber's belt.

* * * * *